United States Patent [19]
Peak

[11] Patent Number: 5,847,766
[45] Date of Patent: *Dec. 8, 1998

[54] VIDEO ENCODING METHOD AND APPARATUS BASED ON HUMAN VISUAL SENSITIVITY

[75] Inventor: Seung-kwon Peak, Kyungki-do, Rep. of Korea

[73] Assignee: Samsung Electronics Co, Ltd., Kyungki-do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 366,716

[22] Filed: Dec. 30, 1994

[30] Foreign Application Priority Data

May 31, 1994 [KR] Rep. of Korea .................. 1994 12142

[51] Int. Cl.$^6$ ...................................... H04N 7/24
[52] U.S. Cl. ........................................... 348/420; 348/390
[58] Field of Search .................... 348/384, 390, 348/400–405, 409–412, 415, 420, 419; 382/232, 236, 238, 248; H04N 7/130, 7/137

[56] References Cited

U.S. PATENT DOCUMENTS

| | | | |
|---|---|---|---|
| 5,144,426 | 9/1992 | Tanaka et al. | 348/420 |
| 5,214,507 | 5/1993 | Aravind et al. | 348/415 |
| 5,245,427 | 9/1993 | Kunihiro | 348/409 |
| 5,321,776 | 6/1994 | Shapiro | 348/384 |
| 5,327,502 | 7/1994 | Katata et al. | 382/248 |
| 5,337,049 | 8/1994 | Shimoda | 348/390 |

*Primary Examiner*—Richard Lee
*Attorney, Agent, or Firm*—Lowe Hauptman Gopstein Gilman & Berner

[57] ABSTRACT

A video encoding method and apparatus classifies a video signal based on human visual sensitivity and determines a reference quantization step size for each classification. To determine the quantization step size for a given transmission speed in consideration of a video signal distribution characteristic, a video encoding apparatus adaptively allocates a target bit number, obtains a final quantization step size by adjusting the reference quantization step size, and encodes the video signal through utilization of the final quantization step size. Thus, the compression effect of an input video signal is increased and the picture quality of the restored image is improved.

2 Claims, 3 Drawing Sheets

VIDEO ENCODING METHOD AND APPARATUS BASED ON HUMAN VISUAL SENSITIVITY

BACKGROUND OF THE INVENTION

The invention relates to a video encoding method and apparatus, and more particularly to, a video encoding method and apparatus in which quantization step sizes are determined and target bits are adaptively allocated, considering human visual sensitivity to an input video signal to be encoded and a distribution characteristics of the input video signal.

Generally, a digital video signal has to be encoded and compressed to transmit the digital video signal through limited transmission paths, due to the large quantity of information contained in a digital video signal. Effective methods to achieve the maximum decrease in information quantity, while maintaining the minimum deterioration of picture quality, include a differential pulse-coded modulation technique which obtains a difference image by utilizing motion detection and compensation, and a transform coding technique which utilizes a discrete cosine transform (DCT) function. Such techniques merely minimize the overlapping between the video signals as a prerequisite for efficient encoding. In practice, however, the actual compression of information is carried out through quantization. Accordingly, to achieve the maximum compression of information while maintaining the minimum deterioration of the restored image, the method to quantize the video signal is very important.

Two factors have to be taken into account for maximally compressing a video signal, while maintaining the minimum deterioration of picture quality. First, quantization step sizes are to be set up by sufficiently reflecting the human visual sensitivity to the video signal to be encoded. Namely, from the standpoint of human visual sensitivity, it is required that the video signal which is imperceptible to the deterioration of picture quality be quantized with a large quantization step size, so that information is compressed as much as possible, while the video signal which is perceptible to the deterioration of picture quality be quantized with a short quantization step size, thus reducing the deterioration of the picture quality. Second, the quantization step size should be determined so that the number of generated bits resulting from encoding adapts to the given transmission speed.

In an existing encoding method, one frame is generally divided into 16×16 macroblocks and quantization step sizes are determined for each macroblock. At this time, a degree of buffer fullness (in terms of data quantity) is calculated for satisfying the given transmission speed and a reference quantization step size which is proportionate to the buffer fullness is obtained. Then, by utilizing a variance value of the video signal in the macroblock, the final quantization step size for adjusting the reference quantization step size is determined by a method now in widespread use.

However, such existing video encoding methods do not only sufficiently reflect the human visual sensitivity but also cause a large difference between the generated bit quantity according to the encoding result and the given transmission speed, which is undesirable.

SUMMARY OF THE INVENTION

Accordingly, an object of the present invention is to provide a video encoding method for maximally compressing a video signal, while minimizing the deterioration of picture quality, in order to solve the above problems.

Another object of the present invention is to provide the most suitable apparatus for realizing the above encoding method.

To achieve the above object, a video encoding method according to the present invention comprises the steps of: classifying macroblocks and variance values of an input video signal for encoding, based on human visual sensitivity; determining a reference quantization step size corresponding to each class of the macroblock classified in the classifying step; adaptively allocating a block target bit number with respect to all block classifications, considering an error between a frame target bit number for a given transmission speed and a frame-bit-generation quantity estimation value, and a bit table; adjusting the reference quantization step size considering the error obtained in the block target bit allocation step; and obtaining a final quantization step size by utilizing a buffer occupation quantity, a macroblock. target bit and the reference quantization step size.

To attain another object, a video encoding apparatus according to the invention comprises: a macroblock classification unit for classifying a macroblock into one of a plurality of predetermined macroblock classes, based on human visual sensitivity to a macroblock for forming an input video signal to be encoded; an $R_Q$ table for storing a reference quantization step size according to the visual sensitivity of the classified macroblock; a block variance classification unit for classifying a variance value of a block into predetermined intervals, in order to predict a quantity of generated bits when the video signal of the block is quantized with the reference quantization step size; a bit table for storing experimentally derived information based on a relationship between the reference quantization step size and the bit generation quantity for each block variance value classified by the block variance classification unit; a histogram calculator for computing a frequency of accumulated generation of each classified block in a frame, with respect to the block classification generated from the executed result obtained by the macroblock classification unit and block variance classification unit; a frame-bit-generation quantity estimator for estimating a quantity of generated frame bits from the bit table and histogram, when all macroblocks of the frame are quantized with the reference quantization step sizes for each macroblock classification; a target bit allocator for allocating a block target bit number with respect to all block classifications, considering an error value between a frame target bit number for a given transmission speed and the frame-bit-generation quantity estimation value calculated in the frame-bit-generation quantity estimator, and the bit table; an $R_Q$ adjustment unit for controlling the reference quantization step size considering the error value; and a controller for obtaining a final quantization step size by utilizing a buffer occupation quantity, a macroblock target bit, and the reference quantization step size.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

The following is a detailed explanation of the present invention, referring to the attached drawings.

Figure 1:
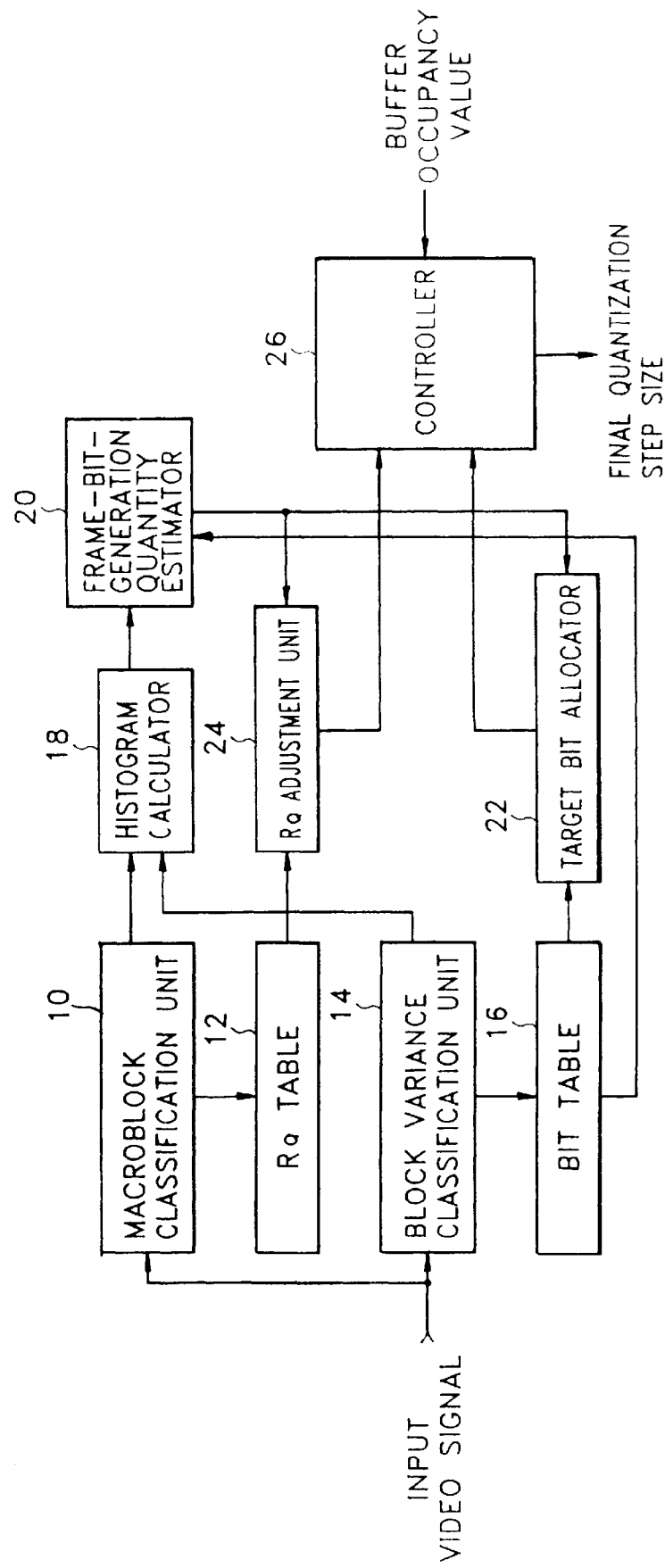
FIG. 1 is a block diagram of a video encoding apparatus according to a preferred embodiment of the present invention.

FIG. 1 is a block diagram of a video encoding apparatus according to a preferred embodiment of the invention. The video encoding apparatus comprises a macroblock classification unit 10, an $R_Q$ table 12, a block variance classification unit 14, a bit table 16, a histogram calculator 18, a frame-bit-generation quantity estimator 20, a target bit allocator 22, an $R_Q$ adjustment unit 24, and a controller 26.

An operation of the video encoding apparatus based on the construction of FIG. 1 will be described below.

Macroblock classification unit 10 classifies the input video signal into sixteen macroblock classes based on human visual sensitivity to the video signal existing in the macroblock, i.e., based on the color signal characteristic and the luminance signal characteristic.

The classification process according to the color signal performed in the macroblock classification unit 10 will be described with reference to FIG. 2. Here, the following inequation (1) is used to classify color signals which are sensitive to human visual sensitivity (e.g., red, magenta and flesh tones) in the YUV coordinate scheme, where variables Y, U and V represent the pixel magnitude of a luminance signal and two chrominance signals, respectively, and $K_1$ and $K_2$ are experimental constants.

$$U - 150 \geq K_1 \left[ K_2 \left( \frac{(Y-128)^2}{255^2} \right) + 1 \right] \times (V - 128)^2 \quad (1)$$

Figure 2:
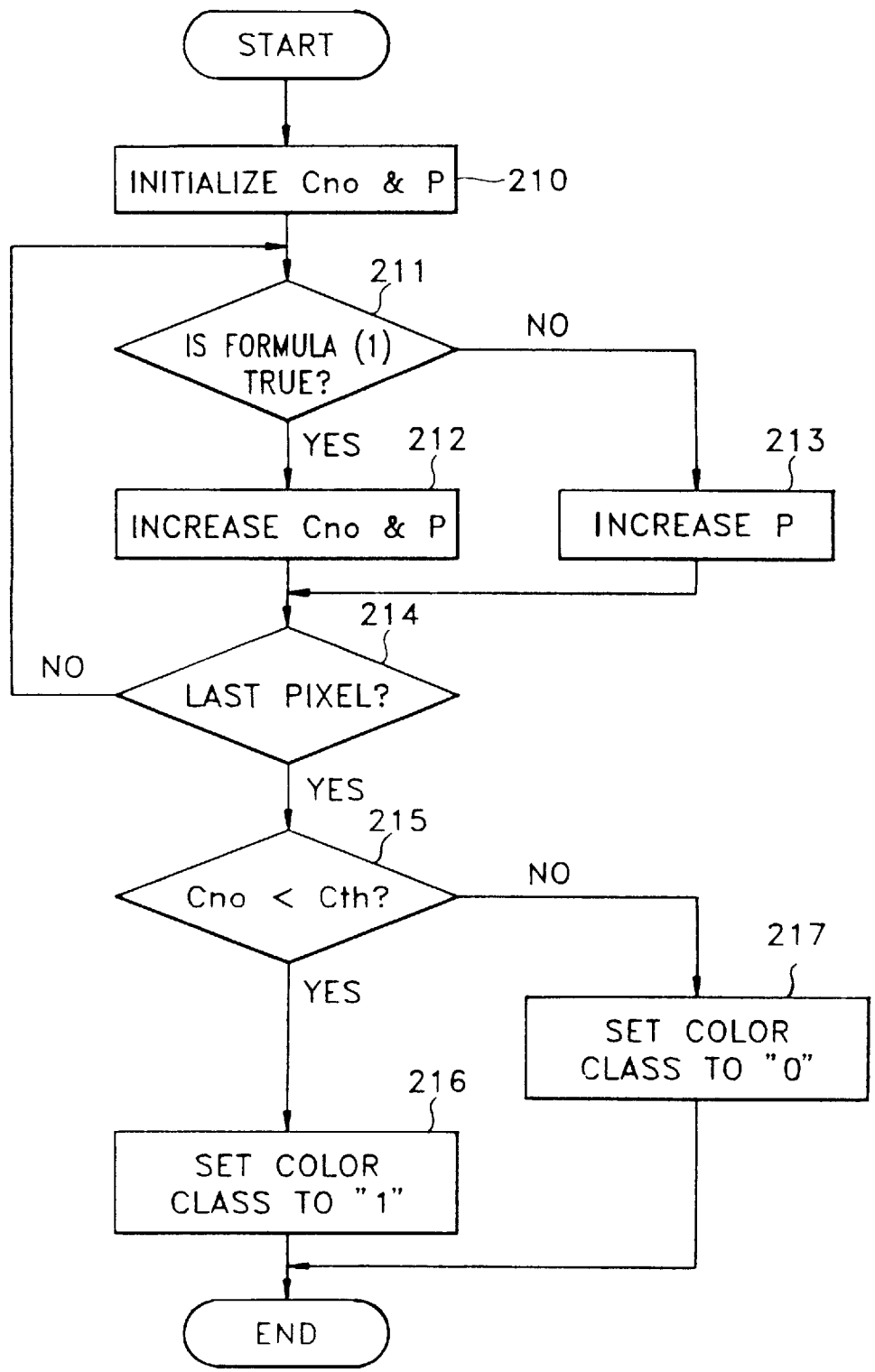
FIG. 2 is a flow chart diagram for explaining the classification of a color signal processed in the macroblock classification unit of FIG. 1.

Referring to FIG. 2, after initialization (step 210), the number (Cno) of pixels (P) in a 16×16 macroblock, whose color signal value satisfies the inequation (1), is calculated (steps 211~214). If the calculated number Cno is less than a threshold value Cth (step 215), the macroblock of the color signal is classified as a block which is visually insensitive to human perception (step 216). Otherwise, that is, if Cno is greater than or equal to Cth (step 215), the macroblock is classified as a visually sensitive block (step 217).

Figure 3:
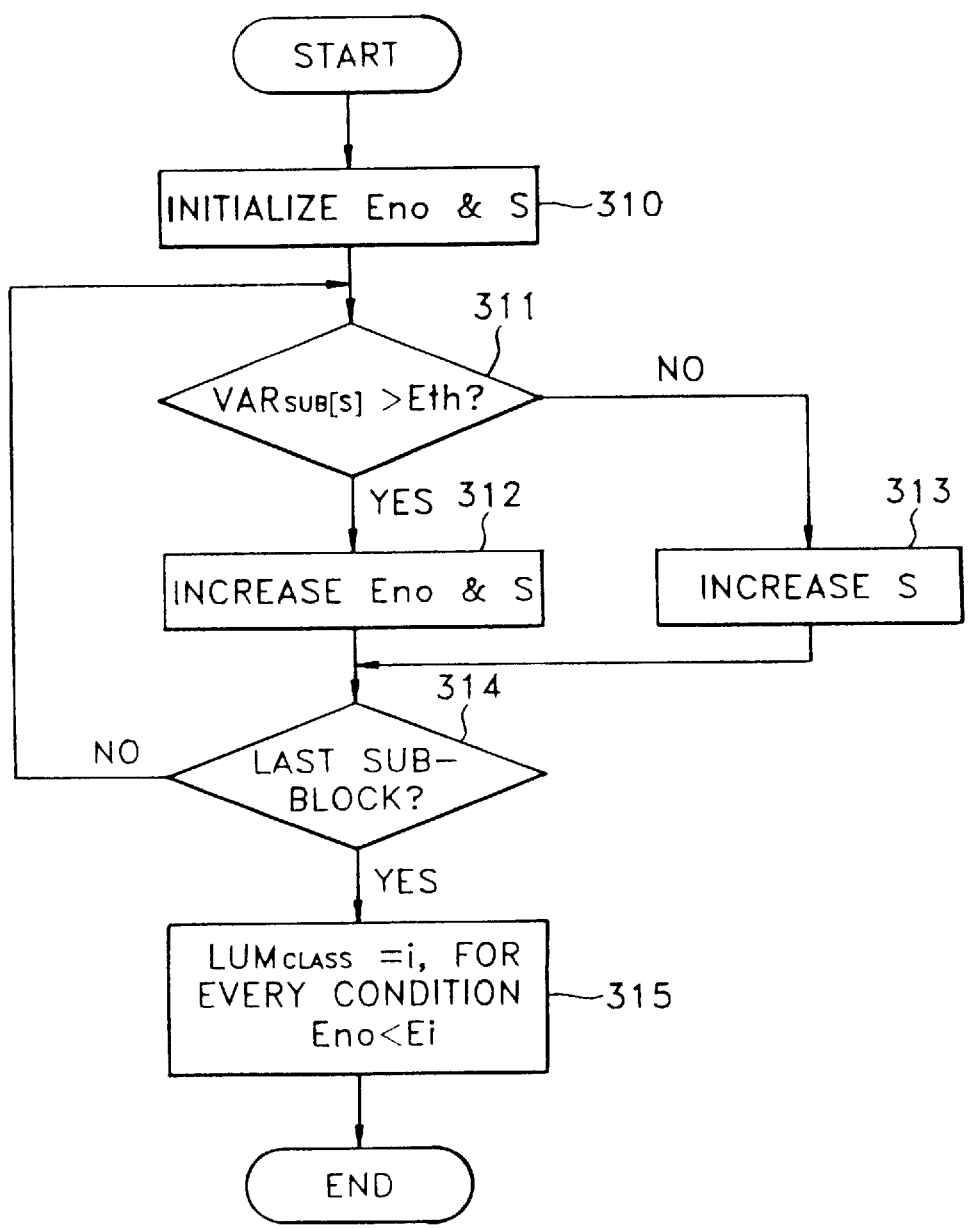
FIG. 3 is a flow chart diagram for explaining the classification of a luminance signal processed in the macroblock classification unit.

On the other hand, referring to FIG. 3, the classification process according to the luminance signal performed in macroblock classification unit 10 is described. First, after having classified the macroblock into 4×4 sub-blocks, a variance value ($VAR_{SUB}$) with respect to the luminance signal of each sub-block (S) is calculated. Referring to FIG. 3, after initialization (step 310), the number (Eno) of sub-blocks (S) having a variance value larger than the threshold value (Eth) among sixteen sub-blocks is calculated (steps 311~314). For calculated numbers Eno less than Ei (wherein i=[0~N]), the macroblock classification according to luminance signal ($LUM_{CLASS}$) is made for each of N classes (step 315).

For example, a macroblock class Mc, which is capable of representing two color signal classifications and four luminance signal classifications, is generated according to Table 1 below. Here, one of a total of eight macroblocks is selected according to each classification result.

TABLE 1

| color class luminance class | color insensitive | | | | color sensitive | | | |
|---|---|---|---|---|---|---|---|---|
| | even | simple edge | complex edge | complex | even | simple edge | complex edge | complex |
| Mc | 0 | 1 | 2 | 3 | 4 | 5 | 6 | 7 |

The $R_Q$ table 12 stores a reference quantization step size $R_Q$ (for I frame, P frame and B frame) suited to the visual sensitivity of the respective macroblock classes classified in macroblock classification unit 10. Here, the reference quantization step size has a value according to macroblock class and the frame processing method thereof. An example of the $R_Q$ table is shown in Table 2 below.

TABLE 2

| $R_Q$ | macroblock classification | | | | | | | |
|---|---|---|---|---|---|---|---|---|
| | 0 | 1 | 2 | 3 | 4 | 5 | 6 | 7 |
| I frame | 8 | 6 | 11 | 24 | 5 | 4 | 8 | 18 |
| P frame | 6 | 5 | 8 | 20 | 4 | 4 | 6 | 15 |
| B frame | 8 | 6 | 11 | 24 | 6 | 5 | 8 | 18 |

Since the reference quantization step size is a quantization step size which is determined considering only the visual sensitivity to the video signal, the reference quantization step size needs to be adjusted considering the given transmission speed. For this, the quantity of bits generated when the video signal is quantized using the reference quantization step size is estimated. The block variance classification unit 14 is used for predicting a quantity of bits generated when the video signal of the block is quantized with the reference quantization step size. Although the bit generation quantity can be approximated by the relationship of the quantization step size, the variance value of the video signal in the block and the bit generation quantity, an exact prediction is difficult due to the non-linear and irregular relationship. Accordingly, by dividing the block variance value into sixteen sections and investigating the quantization step size and the bit generation quantity in each section, an exact quantity of the generated bits can be predicted. An example of a threshold value of each section for dividing the block variance value (Bv) into sixteen sections in block variance classification unit 14 is shown in Table 3 below.

TABLE 3

| Bv | I frame | P frame | B frame |
|---|---|---|---|
| 0 | 16 | 8 | 8 |
| 1 | 32 | 16 | 16 |
| 2 | 64 | 32 | 32 |
| 3 | 128 | 48 | 48 |
| 4 | 256 | 64 | 64 |
| 5 | 384 | 96 | 96 |

TABLE 3-continued

| Bv | I frame | P frame | B frame |
|----|---------|---------|---------|
| 6  | 512     | 128     | 128     |
| 7  | 768     | 160     | 160     |
| 8  | 1024    | 192     | 192     |
| 9  | 1280    | 256     | 256     |
| 10 | 1792    | 320     | 320     |
| 11 | 2048    | 448     | 384     |
| 12 | 3072    | 640     | 448     |
| 13 | 4096    | 896     | 640     |
| 14 | 6154    | 1536    | 1024    |
| 15 | ~       | ~       | ~       |

Bit table 16 stores experimentally derived information based on a relationship between reference quantization step size and a bit generation quantity in each section of block variance value (Bv) classified in the block variance classification unit 14. An example of bit table 16 is shown in Table 4 below.

TABLE 4

| | macroblock classification | | | | | | | |
|---|---|---|---|---|---|---|---|---|
| Bv | 0 | 1 | 2 | 3 | 4 | 5 | 6 | 7 |
| 0  | 2   | 5   | 0   | 0  | 6   | 6   | 2   | 0  |
| 1  | 10  | 20  | 5   | 0  | 25  | 25  | 10  | 1  |
| 2  | 18  | 31  | 11  | 1  | 38  | 38  | 18  | 4  |
| 3  | 28  | 44  | 18  | 5  | 53  | 53  | 28  | 9  |
| 4  | 37  | 57  | 26  | 8  | 66  | 66  | 37  | 14 |
| 5  | 50  | 71  | 35  | 13 | 82  | 82  | 50  | 20 |
| 6  | 60  | 82  | 44  | 18 | 94  | 94  | 60  | 26 |
| 7  | 72  | 97  | 53  | 23 | 111 | 111 | 72  | 32 |
| 8  | 85  | 113 | 63  | 28 | 127 | 127 | 85  | 39 |
| 9  | 95  | 125 | 72  | 33 | 141 | 141 | 95  | 45 |
| 10 | 106 | 136 | 81  | 38 | 154 | 154 | 106 | 51 |
| 11 | 113 | 144 | 87  | 42 | 161 | 161 | 113 | 57 |
| 12 | 123 | 155 | 96  | 46 | 173 | 173 | 123 | 63 |
| 13 | 131 | 164 | 104 | 52 | 182 | 182 | 131 | 69 |
| 14 | 141 | 178 | 111 | 58 | 198 | 198 | 141 | 76 |
| 15 | 153 | 183 | 122 | 62 | 216 | 216 | 153 | 83 |

When the macroblock classification (FIG. 2) executed in macroblock classification unit 10 is one of eight classifications (the value of Mc is from 0 to 7) and the block variance classification executed in block variance classification unit 14 is one of sixteen (the value of Bv is from 0 to 15), there is a total of 128 different block classifications. In histogram calculator 18, a histogram representing the frequency at which the respective block classifications is generated in the frame is computed. Here, when the histogram calculation result is defined as H[Mc][Bv], H[1][2] means that the block classified as Mc=1 and Bv=2 occurs H times in one frame.

The frame-bit-generation quantity estimator 20 estimates the total bit generation quantity in one frame, when all macroblocks in the frame are quantized with the corresponding reference quantization step size according to each macroblock classification. The frame-bit-generation quantity can be obtained from the bit table indicated by B[Mc][Bv] and the histogram indicated by H[Mc][Bv]. Here, if the estimated value of the frame-bit-generation quantity is expressed as $EB_{FRAME}$, the estimated value of the frame-bit-generation quantity is obtained by the following second equation (2).

$$EB_{FRAME} = \sum_{Mc=0}^{7} \sum_{Bv=0}^{15} B[Mc][Bv] \times H[Mc][Bv] \quad (2)$$

(The above Tables 1 and 3 show examples of this (equation, for macroblock classification Mc and block variance value Bv, respectively.)

The target bit allocator 22 allocates the block target bit with respect to a total of 128 cases of the block classification, considering an error between a given frame target bit ($TB_{FRAME}$) set by the transmission speed and the estimated frame-bit-generation value ($EB_{FRAME}$) and a bit table. The block target bit thus-obtained becomes a value sufficiently reflecting the human visual sensitivity, the intra-frame distribution of the video signal, and the transmission speed.

The target bits belonging to a macroblock having a macroblock classification Mc and a block variance classification Bv is expressed TB[Mc][Bv], which is computed by the following third equation (3).

$$TB[Mc][Bv] = B[Mc][Bv] \left( \frac{TB_{FRAME}}{EB_{FRAME}} \right) \quad (3)$$

On the other hand, when the block target bit of the j-th block in the i-th macroblock in the frame is indicated as TB(i,j), by assuming the macroblock classification result of the i-th macroblock is Mc and the block variance classification result of the j-th block is Bv, the following fourth equation (4) is established.

$$TB(i,j) = TB[Mc][Bv] \quad (4)$$

Here, the macroblock target bit number MTB(i) of the i-th macroblock can be expressed as a total sum of the block target bits TB(i,j) in the macroblock as the following fifth equation (5).

$$MTB(i) = \sum_{j=1}^{6} TB(ij) \quad (5)$$

The $R_Q$ adjustment unit 24 adjusts $R_Q$ for each macroblock classification, according to the following sixth equation (6), considering an error $B_{ERROR}$ between a frame target bit value $TB_{FRAME}$ and an estimated frame-bit-generation quantity $EB_{FRAME}$ (expressed as $B_{ERROR} = TB_{FRAME} - EB_{FRAME}$).

$$\overline{R_Q}[Mc] = R_Q[Mc] - \frac{B_{ERROR} 31 W[Mc]}{45 \text{buff}_{size}} \quad (6)$$

Here, $R_Q[Mc]$ indicates the reference quantization step size, W[Mc] is a weight value according to the polarity of $B_{ERROR}$ for the given macroblock classification Mc, and $\text{buff}_{size}$ is buffer capacity. Thus, an adjusted reference quantization step size is determined.

The controller 26 computes a buffer occupation quantity from the bit generation quantity obtained by encoding all the previous macroblocks, and a final quantization step size is obtained utilizing the buffer occupation quantity, the macroblock target bit, and $R_Q$. When the final quantization step size of the m-th macroblock of the frame is $F_Q(m)$ and the buffer occupation quantity after having encoded until the (m−1)th macroblock is B(m−1), the final quantization step size $F_Q(m)$ is determined by the following seventh equation (7).

$$F_Q(m) = \overline{R_Q} + \frac{S(B_{INIT} + B(m-1))}{\text{buff}_{size}} \quad (7)$$

-continued where $$B(m-1) = \sum_{i=1}^{m-1} RB(i) - MTB(i)$$

RB(i) in the equation (7) indicates a real-bit generation quantity owing to the encoding result of the i-th macroblock, $B_{INIT}$ indicates a buffer occupation quantity just before processing the current frame, and S indicates a constant.

An embodiment according to the present invention can be applied to the international standard schemes MPEG-1 and MPEG-2, the CCITT recommended scheme H.261, etc.

As described above, in a video encoding method and apparatus according to the present invention, a video signal is classified based on the characteristics of human visual sensitivity. That is, a reference quantization step size is determined for each macroblock classification while a target bit number is adaptively allocated and a final quantization step size is obtained by adjusting the reference quantization step size. By encoding the video signal through the utilization of the final quantization step size, the compression effect of an input video signal is great and the picture quality of the restored picture is improved.

What is claimed is:

1. A method for encoding a video signal, comprising the steps of:

partitioning frame data of an input video signal into macroblocks; determining whether a color signal of each macroblock is visually sensitive or not based on relative magnitude of YUV components of pixels in each macroblock establishing two classes according to the determining step and classifying each macroblock into one of two classes;

partitioning each macroblock into sub-blocks, computing a variance value for a luminance signal of each sub-block, counting the number of sub-blocks in one macroblock which have a variance value larger than a predetermined threshold value, establishing N classes according to the counted number of sub-blocks and classifying each macroblock into one of the N classes;

storing a reference quantization step size assigned to each of the 2×N classes in an $R_Q$ table;

establishing predetermined threshold variance values and classifying each macroblock into one of M classes according to the variance value of each macroblock and the predetermined threshold variance values;

storing information on bit number for each of the 2×N classes in a bit table, which is experimentally derived on the basis of the reference quantization step size;

determining which of the 2×N×M classes each macroblock in a frame should be assigned to and computing an accumulated number of macroblocks classified into each class;

estimating a quantity of generated frame bits according to the bit table and the histogram when all macroblocks of a frame are quantized with the reference quantization step sizes for each class;

allocating a target bit number by a macroblock with respect to each of the classified classes, considering an error value between a frame target bit numbers given on the basis of a transmission speed and the frame-bit-generation quantity estimation value, and the bit table;

adjusting the reference quantization step size considering the reference quantization step size in said $R_Q$ table and said error value; and calculating a buffer occupation quantity from an amount of bits generated by encoding all previous macroblocks before a current macroblock and obtaining a final quantization step by utilizing the buffer occupation quantity, the macroblock target bit number, and the adjusted reference quantization step size.

2. An apparatus for encoding a video signal, comprising:

a macroblock classification unit including a first classifier for partitioning frame data of an input video signal into macroblocks; determining whether a color signal of each macroblock is visually sensitive or not based on the relative magnitude of YUV components of pixels in each macroblock; establishing two classes according to the determination and classifying each macroblock into one of the two classes and a second classifier for partitioning each macroblock into sub-blocks, computing a variance value for a luminance signal of each sub-block, counting the number of sub-blocks in one macroblock which have a variance value larger than a predetermined threshold variance value, establishing N classes according to the counted number of sub-blocks and classifying each macroblock into one of the N classes to thereby classify each macroblock into one of the 2×N classes;

an $R_Q$ table for storing a reference quantization step size assigned to each of the 2×N classes;

a block variance classification unit for establishing predetermined threshold variance values and classifying each macroblock into one of M classes according to the variance value of each macroblock and the predetermined threshold variance values;

a bit table for storing information on bit number for each of the 2×N classes, which is experimentally derived on the basis of the reference quantization step size;

a histogram calculator for determining which of the 2×N×M classes of each macroblock in a frame should be assigned to and computing an accumulated number of macroblocks classified into each class;

a frame-bit-generation quantity estimator for estimating a quantity of generated frame bits according to the bit table and the histogram, when all macroblocks of a frame are quantized with the reference quantization step sizes for each class;

a target bit allocator for allocating a target bit number by a macroblock with respect to each of the classified classes, considering an error value between a frame target bit number given on the basis of a transmission speed and the frame-bit-generation quantity estimation value, and the bit table;

a $R_Q$ adjustment unit for adjusting the reference quantization step size considering the reference quantization step size in said $R_Q$ table and said error value; and a controller for obtaining a final quantization step size by utilizing a buffer occupation quantity, the macroblock target bit number, and the adjusted reference quantization step size, wherein the buffer occupation quantity is calculated from an amount of bits generated by encoding all previous macroblocks before a current macroblock.

* * * * *